March 22, 1949.  C. R. WHITE  2,464,912
MICROMETER SURFACE GAUGE
Filed May 1, 1945
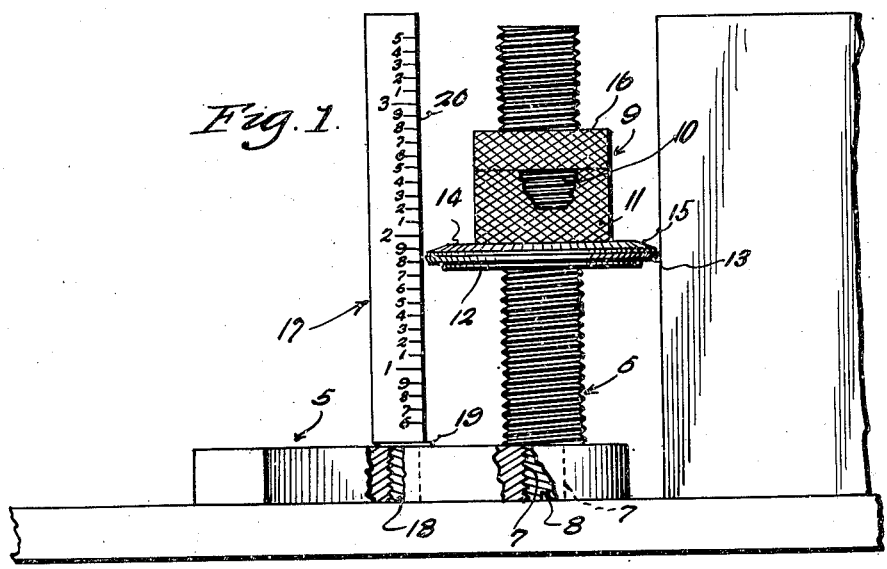
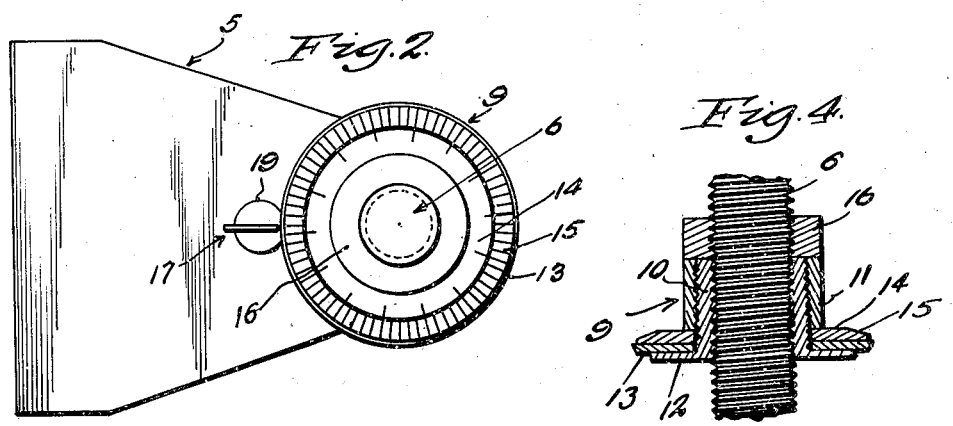
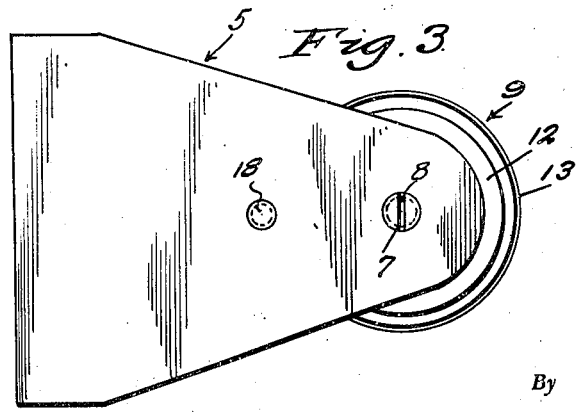
Inventor
CHARLES R. WHITE
By *Clarence A. O'Brien and Harvey B. Jackson*
Attorneys Patented Mar. 22, 1949

2,464,912

UNITED STATES PATENT OFFICE 2,464,912

MICROMETER SURFACE GAUGE

Charles R. White, Philadelphia, Pa.

Application May 1, 1945, Serial No. 591,354

3 Claims. (Cl. 33—170)

The present invention relates to a micrometer type surface or height gauge which is expressly designed and useful to facilitate the laying out of work for expeditious machining, this with greater accuracy than can be had through the use of a so-called scriber type surface gauge, the type which is set to a scale dimension.

A further object of the invention is to provide a readily adaptable height measuring gauge which is appreciably simple in construction, comparatively inexpensive to manufacture, easy to assemble, convenient and adequate in use, and which is otherwise aptly fitted and capable of producing resultful measurements to the desired fractional fineness in degrees.

In carrying out the principles of the invention, I have perfected a precision measuring gauge which is dependable for accurate gauging of height and for the scribing of work pieces, particularly in the tool and die field of endeavor.

Briefly, the preferred embodiment of the invention is characterized by a base plate, a screw-threaded standard attached to and rising perpendicularly therefrom, an index scale attached to and rising perpendicularly from the base and parallel to the standard, and an appropriately calibrated, manually regulated disk scriber having its scribing perimeter arranged for coaction with the graduations on said scale.

More particularly, novelty is predicated on the especially constructed scribing unit carried by the aforementioned screw threaded standard. This unit is characterized by a bushing which is internally and externally screw-threaded, being adjustably mounted on the standard and having an outstanding annular flange to accommodate the scribing annulus and calibrated indicating annulus associated therewith, the latter two parts being clamped by a collar surrounding the bushing and threaded thereon and held in place by a lock nut.

Other features, advantages and objects will become readily apparent from the following description and the accompanying illustrative drawings.

In the accompanying drawings, wherein like numerals are employed to designate like parts throughout the views:

Figure 1 is a view, primarily in elevation, with certain portions broken away and shown in section, of a height gauge constructed in accordance with the principles of the invention, and showing the manner in which it is generally used in association with the work to be measured.

Figure 2 is a top plan view of the gauge removed from the work.

Figure 3 is a bottom plan view of the structure seen in Figure 2.

Figure 4 is a fragmentary view in section and elevation showing the construction of the height measuring and scribing unit.

The base 5 of the guage is of block-like form of appropriate shape, materials and dimensions. At the righthand end is the aforementioned screw-threaded standard 6. The lower end of this is provided with a reduced screw-threaded stud 7 which is tapped into a screw-threaded hole in the base 5, said stud having a screw-driver kerf 8 for obvious assembling purposes.

The vertically adjustable scribing and height measuring unit or device is denoted generally by the numeral 9. As brought out in Figure 4, this is characterized by a bushing 10 which is internally screw-threaded to fit the threads on the standard and is externally screw-threaded to accommodate a knurled collar 11. The bushing is provided, at its bottom, with an outstanding annular ledge flange 12. This flange serves to support the scribing annulus 13, whose knife-like edge extends outwardly beyond the perimeter or shoulder provided by said flange 12. A second annulus 14 is placed on top of the scribing annulus, this being the measuring annulus, and this has its outer upper surface beveled outwardly and downwardly, as at 15, and suitably calibrated. The perimeter of the calibrated portion 15 terminates short of the knife edge of the scribing ring or annulus 13. The two rings 13 and 14 are thus adjustably clamped between the collar 11 and flange 12. A lock nut 16 is threaded on the standard and engages the upper end of the bushing and collar 10 and 11, as shown, to lock the device 9, as a unit, in any set position.

The sectional make-up of the unit 9 is important because in the final adjustment for accuracy, it is necessary, so far as I have been able to ascertain, to construct it as shown in detail in Figure 4. As the perpendicular standard 6 is fixed solidly in the base 5, adjustment of the knife edge of the scriber 13 to the standard 6 must be made by moving the scale ring or annulus 14. This requires loosening of the nut 16 and also loosening of the clamping collar 11, after which the graduations 15 can be properly regulated in respect to the pre-gauge pitch of the threads on the standard. After the initial adjustment is had, it need not be disturbed further except to re-sharpen the scribed blade or for other readjustment purposes.

In micrometers the threads are usually forty to the inch with twenty-five graduations on the movable member. Forty turns are necessary to cover a distance of one inch. As the range of this instrument may be six inches or more, that would mean many turns to go from one setting to another. Ten or five threads to the inch would make it much more rapid. In this case, ten threads to the inch are being used with one hundred graduations on the movable member, each division equal to one thousandth of an inch.

The complemental index scale 17 is in the nature of a graduated ruler and comprises a flat strip of metal of appropriate gauge and height, the same being preferably rectangular in cross-sectional form. At its lower end, it is provided with a screw-threaded stud 18 which is fastened in a socket formed in the base 5, and at the upper end of the stud is an annular stop collar 19 which rests on the top surface of the base. The right-hand edge is suitably graduated, as indicated at 20, these graduations to coact with the knife edge of the scribing disk 13. Manifestly and in practice the index scale must show graduations as if the scale extended to the base or lower side of the base 5. If the base is .5 inch thick, the graduations would start at .5 inch at the top surface of the base. However, this is a manufacturing factor which need not necessarily be described in detail here.

In this gauge, it will be observed that the scriber device 9 can be readily adjusted up and down on the threaded standard, that it has a hardened beveled edge which is parallel at all times with the base and is provided with a suitable scale, preferably on some softer metal such as aluminum, with the divisions suitably calibrated according to prescribed needs. One of its advantages over present vernier height gauges is its capacity for easy readability and the consequent lowering of errors which is usually traceable to misreading of the coacting graduations on the vernier in relation to the scale.

Like other tools and instruments in this category, the mode of use and adjustment is best learned from experience. Consequently, it seems without requirement here that instructions for use be included.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

I claim:

1. A height gauge comprising a horizontal base, a screw-threaded standard connected to and rising perpendicularly from said base, a screw-threaded bushing mounted for adjustment on said standard, said bushing being provided with a scribing ring, said ring being substantially parallel to the base and having a marginal endless scribing edge, a second ring having a beveled calibrated surface superimposed upon said scribing ring, an annular shoulder carried by said bushing and arranged radially and inwardly of said scribing edge and against the underside of the first-named ring, and a scale mounted on said base and vertically arranged and parallel to said standard, said scale having graduations, the calibrations on said second ring coacting with the graduations on said scale.

2. In a height gauge of the class described, a base, a screw-threaded standard attached to and rising from said base, a bushing threaded and vertically adjustable on said standard, a scribing ring removably and adjustably carried by said bushing, and a clamping collar threaded on said bushing for holding said scribing ring in place, and a second ring superimposed upon said scribing ring and held in place by said collar and bushing, the outer perimeter edge of said second ring being provided with graduations.

3. In a height gauge of the class described, a base, a screw-threaded standard attached to and rising from said base, a scribing unit comprising a bushing, said bushing being internally screw-threaded and mounted on the threads of said standard, said bushing being externally screw-threaded and provided at its bottom with an outstanding annular supporting ledge, a knurled collar adjustably mounted on the external threads of said bushing, a ring seated on said annular ledge and having its outer perimeter provided with a knife-like edge, said ring constituting a scriber, a second ring mounted on said first named ring and interposed between said latter ring and an adjacent edge of said collar, said collar serving to clamp both of said rings in place, and said second ring having its outer perimeter beveled and provided with graduations terminating at a radial point inwardly of the knife-like edge of the first named ring.

CHARLES R. WHITE.

REFERENCES CITED

The following references are of record in the file of this patent:

UNITED STATES PATENTS

| Number | Name | Date |
|---|---|---|
| 12,861 | Hart | May 15, 1855 |
| 375,901 | Stedman | Jan. 3, 1888 |
| 1,039,055 | Helwig | Sept. 17, 1912 |
| 1,040,078 | Widen | Oct. 1, 1912 |